United States Patent
Maree et al.

(10) Patent No.: US 7,459,087 B2
(45) Date of Patent: Dec. 2, 2008

(54) WATER TREATMENT

(75) Inventors: Johannes Philippus Maree, Pretoria (ZA); Guido Kamiel Erik Bieseman, Benoni (ZA)

(73) Assignee: CSIR (ZA)

( * ) Notice: Subject to any disclaimer, the term of this patent is extended or adjusted under 35 U.S.C. 154(b) by 0 days.

(21) Appl. No.: 11/871,850

(22) Filed: Oct. 12, 2007

(65) Prior Publication Data

US 2008/0087605 A1    Apr. 17, 2008

(30) Foreign Application Priority Data

Oct. 12, 2006    (ZA) ............................... 2006/08539

(51) Int. Cl.
*C02F 3/00*    (2006.01)
(52) U.S. Cl. ....................... 210/668; 210/670; 210/676; 210/681
(58) Field of Classification Search ................. 210/670, 210/676, 681, 668
See application file for complete search history.

(56) References Cited

U.S. PATENT DOCUMENTS

| | | | | |
|---|---|---|---|---|
| 2,059,553 | A | * | 11/1936 | Churchhill ................... 210/670 |
| 3,492,086 | A | * | 1/1970 | Strommen et al. .......... 423/489 |
| 2006/0086668 | A1 | * | 4/2006 | Bhinde et al. ............... 210/670 |

* cited by examiner

*Primary Examiner*—Chester T Barry
(74) *Attorney, Agent, or Firm*—Husch Blackwell Sanders Welsh & Katz

(57)    ABSTRACT

A method of treating water to remove fluoride ions from the water, thereby to reduce the dissolved fluoride content of the water, is provided. The method includes, in a contacting step, contacting water containing dissolved fluoride ions with alumina, to cause the fluoride ions to react with and become bound to the alumina. In a regenerating step, the alumina, when spent, is regenerated to drive off fluoride ions bound thereto. The regenerated alumina is recycled to the contacting step where it is used to remove further fluoride ions from the water. The fluoride ions driven off the alumina in the regenerating step are passed on to downstream processing thereof.

16 Claims, 1 Drawing Sheet

WATER TREATMENT

CROSS-REFERENCE TO RELATED APPLICATIONS

Figure 1:
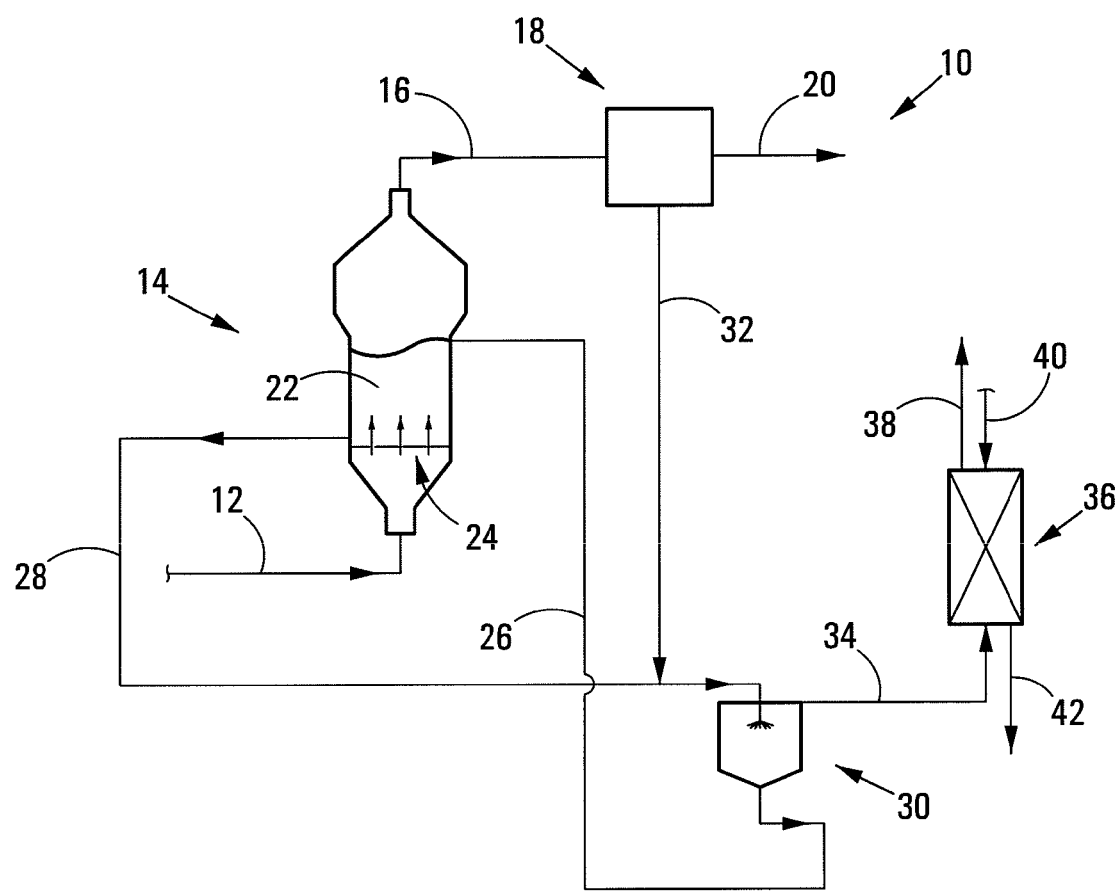

This application is the claims priority under the Paris Convention for the Protection of Industrial Property and through the World Trade Organization to Patent Application No. ZA 2006/08539, filed Oct. 12, 2006 in the Companies and Intellectual Properties Registration Office of South Africa.

BACKGROUND OF THE INVENTION

THIS INVENTION relates to water treatment. More particularly, it relates to a method suitable for, but not restricted to, the removal of fluoride ions in water arising from the production of aluminium from bauxite by a process wherein bauxite is reacted with hydrofluoric acid to produce aluminium fluoride, followed by the reduction of the aluminium fluoride to obtain aluminium metal.

BRIEF SUMMARY OF THE INVENTION

According to the invention, there is provided a method of treating water to remove fluoride ions from the water, thereby to reduce the dissolved fluoride content of the water, the method including:

in a contacting step, contacting water containing dissolved fluoride ions with alumina, to cause the fluoride ions to react with and become bound to the alumina;

in a regenerating step, regenerating the alumina, when spent, to drive off fluoride ions bound thereto;

recycling the regenerated alumina to the contacting step where it is used to remove further fluoride ions from the water; and passing on the fluoride ions driven off the alumina in the regenerating step, to downstream processing thereof.

BRIEF DESCRIPTION OF THE SEVERAL VIEWS OF THE DRAWING(S)

FIG. 1 is a schematic showing a flow diagram of an installation for carrying out the method of the present invention.

DETAILED DESCRIPTION OF THE INVENTION

As indicated above, the method is suitable for treating raw fluoride ion-containing water obtained during the production of aluminium from bauxite by reacting the bauxite with hydrofluoric acid. Accordingly, the alumina ($Al_2O_3$) with which the raw water is contacted is conveniently in the form of bauxite. The contacting of the raw water with bauxite may be effected by passing the raw water through a bed, which may be a fixed bed, a completely mixed bed or, conveniently, a fluidized bed, of bauxite, which is thus in particulate form, with the fluoride ions reacting with the bauxite to produce aluminium fluoride, in accordance with Reaction (1):

$$Al_2O_3 + 3H_2O + 6F^- \rightarrow 2AlF_3 + 6OH^- \quad (1)$$

According to Reaction (1), aluminium fluoride is produced and the water is rendered alkaline or at least provided with a raised pH. However, Reaction (1) preferably takes place with the water at a pH in the range 6.5-7.5, and the method thus contemplates adding a suitable acid, such as sulphuric acid, hydrochloric acid and/or carbonic acid (carbon dioxide) to the contacting step to keep the pH of the water in the range 6.5-7.5.

The regenerating of the spent bauxite may be effected by heating it, the heating acting both to dry the bauxite and to drive off fluoride ions as HF gas/vapour, in accordance with the Reaction (2):

$$2AlF_3 + 3H_2O \rightarrow Al_2O_3 + 6HF \quad (2)$$

It follows that, in accordance with the invention, the fluoride ions driven off in the regenerating step may thus be passed on in the form of hydrogen fluoride to downstream processing.

In the regenerating step, the heating of the spent bauxite, which may be by means of hot gas, electrical heating or infra-red heating, may be supplemented and accompanied by water removal by filtration, for example vacuum filtration by means of a belt filter.

The downstream processing of the hydrogen fluoride driven off during the regenerating step is, when the method is associated with aluminium production from bauxite as mentioned above, conveniently by using the hydrogen fluoride to supplement the hydrogen fluoride used for the aluminium production by reacting the bauxite with hydrogen fluoride. Instead, however, the downstream processing may include or involve reacting the hydrogen fluoride with sodium hydroxide, for example in a scrubber, followed by addition of calcium hydroxide to the resultant sodium fluoride solution, to precipitate the fluoride as a calcium fluoride product or by-product. This will take place by way of Reactions (3) and (4):

$$HF + NaOH \rightarrow NaF + H_2O \quad (3)$$

$$2NaF + Ca(OH)_2 \rightarrow CaF_2 + 2NaOH \quad (4)$$

The overall reaction can be expressed by Reaction (5):

$$2HF + Ca(OH)_2 \rightarrow CaF_2 + 2H_2O \quad (5)$$

and indeed the same result can be achieved by scrubbing the hydrogen fluoride-containing gas or off-gas from the regenerating step with a calcium hydroxide solution in the form of a milk of lime solution.

It is expected that the raw water will typically originate as surface water in the vicinity of an aluminium smelter which produces aluminium fluoride. Such surface water can contain suspended solids, and the method thus contemplates the preliminary step of filtering the raw water to remove suspended solids therefrom, prior to the contacting of the raw water with the bauxite. This filtration will typically be by means of one or more sand filters. Any bauxite which is carried over from the contacting step can similarly be filtered out, again typically by means of one or more sand filters; and back-wash from said sand filters can have any bauxite contained therein recycled to the process, for example by being fed into the bauxite regenerating step together with the spent bauxite from the contacting step.

The raw water, which typically has a fluoride ion content in the range 1-50 mg/l, may furthermore, if desired, be subjected to flocculation, for example by means of aluminium sulphate as flocculant, to flocculate the suspended solids prior to removal of the suspended solids by filtration.

It is expected that bauxite make-up will be intermittently fed to the contacting step, as required, to compensate for any losses of bauxite in the treated water.

The invention will now be described, by way of example, with reference to the accompanying drawing, in which the single figure schematically shows a flow diagram of an installation for carrying out the method of the present invention.

In the FIG. 1, the installation is generally designated by reference numeral 10. A raw water feed line 12 leading from the environment is pumped by a feed pump and a back-up or booster pump (both not shown) upwardly into the bottom of a fluidized-bed reactor 14 from which a treated water discharge line 16 issues and leads to a sand filter 18. A product water flow line 20 leads from the sand filter 18 back into the environment from which the raw water is pumped along line 12.

In the reactor 14, a fluidized bed of particulate bauxite is shown at 22, above a flow distributor 24. A bauxite feed line 26 is shown feeding into the reactor 14 at the top of the bed 22, and a bauxite withdrawal line 28 is shown leaving the reactor 14 at the bottom of the bed 22, above the distributor 24. The line 28 leads to a dryer 30 and is joined by a sludge backwash line 32 from the filter 18. Flow line 26 leads from the dryer 30 to the reactor 14.

A hydrogen chloride gas/water vapour flow line 34 leads from the dryer 30 to a lime contact reactor 36, provided with an air outlet line 38, with a calcium hydroxide feed line 40, and with a calcium fluoride outlet line 42.

In terms of the method, fluoride-rich raw surface water is pumped from the environment (ponds, dams, streams, rivers, lakes or the like in the vicinity of an aluminium smelter of the type mentioned above producing aluminium from bauxite) upwardly into the reactor 14 at a rate selected to fluidize the bed 22, but to limit any carry-over of bauxite, along line 16, to acceptably low levels. The booster or back-up pump is used at start-up as the bauxite tends to settle as a solid cake when fluidizing is discontinued. A high pressure water lance or the like fluidizing aid can also be used to assist start-up.

In the reactor 14, the bauxite in the bed 22 reacts with fluoride ions in the raw water according to Reaction (1):

$$Al_2O_3 \text{ (bauxite)} + 3H_2O + 6F^- \rightarrow 2AlF_3 + 6OH^- \tag{1}$$

If necessary, depending on the pH on the raw water, a suitable acid such as carbonic acid is fed (not shown) to the reactor 14 to keep the water pH in the bed 22 in the range 6.5-7.5. Fresh or regenerated bauxite is fed to the bed 22 along line 26 and spent bauxite is withdrawn therefrom along line 28, continuously or intermittently, at a matched rate to ensure that there is no unwanted carry-over of bauxite into line 16, and to ensure that the depth of the bed 22 remains substantially constant, the rate being selected to ensure that the water in line 16 has an acceptably low fluoride content.

Water is allowed to drain from the bauxite withdrawn in line 28, to obtain wet spent bauxite with a water content of about 55% by mass, which is fed into the dryer 30 where it is dried by a combination of warm air and electrical (radiant) heating. In the dryer, the bauxite is heated to a temperature in the range 100-250° C., selected to ensure that fluoride is driven off the AlF$_3$ in the spent bauxite as HF, while the bauxite is simultaneously reactivated to Al$_2$O$_3$, according to Reaction (2):

$$2AlF_3 + 3H_2O \rightarrow Al_2O_3 + 6HF \tag{2}$$

The reactivated bauxite is fed along line 26 from the dryer 30 to the bed 22 in the reactor 14.

The HF gas released during the bauxite drying and reactivation in the dryer 30 passes, together with air and water vapour, along line 34 to reactor 36 which is fed with milk of lime along line 40. The HF feed to the reactor 36 passes up reactor 36, countercurrent to the downward feed of milk of lime from line 40 through the reactor 36. In the reactor 36 the HF from line 34 reacts with the milk of lime from line 40 according to the Reaction (5):

$$2HF + Ca(OH)_2 \rightarrow CaF_2 + 2H_2O \tag{5}$$

The CaF$_2$ produced issues from reactor 36 along line 42 and air and water vapour issue from the reactor 36 along line 38 to the atmosphere.

In the sand filter 18, the treated water from flow line 16 is filtered to remove bauxite particles therefrom, and the filtered water is released from the filter 18 into the environment along the flow line 20. Filter 18 is periodically back-washed to remove accumulated bauxite fines therefrom, the removed bauxite in the back-wash being fed along line 32 from the filter 18 into line 28, for drying and regeneration in the dryer 30 and subsequent recycling to the bed 22 in the reactor 14.

It is a feature of the invention as illustrated with reference to the drawing that it provides an effective and easily-applied method of reducing the fluoride content of surface waters in the environment, while producing calcium fluoride as a valuable by-product, useful, for example, for making toothpaste.

Alternatively, the hydrogen fluoride gas from the dryer 30 can be used to treat bauxite to render it fluoride-rich, for use as a bauxite raw material or feed supplement in the smelting of bauxite to produce aluminium according to the process mentioned above.

In a further variation of the illustrated method, back-wash from the filter 18 can be centrifuged prior to feeding the bauxite from the back-wash to the dryer 30, water from the centrifuge (not shown) being fed to the reactor 14, for example along line 12.

In a still further variation of the method, carried out on a batch-wise basis rather than the continuous basis described with reference to the drawing, a batch of fresh or regenerated bauxite is used in the reactor 14 to form the bed 22, and raw water is fed through the bed 22 until an unacceptable break-through of fluoride is noted in line 16 and the bauxite is spent. The spent bauxite is then dumped from the reactor 14 and replaced by a further batch of fresh or regenerated bauxite. The spent bauxite is dumped into a completely-mixed reactor where it is kept in suspension, from which it is pumped to a filter and dryer, before it is passed on for downstream use, for example as smelter feed or for recycling in a regenerated state to the reactor 14.

The invention claimed is:

1. A method of treating water to remove fluoride ions from the water, thereby to reduce the dissolved fluoride content of the water, the method including:
    in a contacting step, contacting water containing dissolved fluoride ions with bauxite, to cause the fluoride ions to react with bauxite;
    in a drying step, heating the bauxite, when spent, to a temperature in the range 100° C. to 250° C. to dry the bauxite and to drive off fluoride ions bound thereto as HF gas/vapour;
    recycling the dried bauxite to the contacting step where it is used to remove further fluoride ions from the water or passing the dried bauxite on for downstream use as smelter feed; and
    passing on the HF gas/vapour produced in the drying step, to downstream processing thereof.

2. A method according to claim 1, wherein the water that is treated is raw fluoride ion-containing water obtained during the production of aluminium from bauxite by reacting the bauxite with hydrofluoric acid.

3. A method according to claim 1, wherein the contacting of the water with the bauxite is effected by passing the water through a bed of the bauxite which is thus in particulate form, with the fluoride ions reacting with the bauxite to produce aluminium fluoride in accordance with Reaction (1):

$$Al_2O_3 + 3H_2O + 6F^- \rightarrow 2AlF_3 + 6OH^- \tag{1}.$$

4. A method according to claim 3, which includes adding an acid to the contacting step to maintain the pH of the water in the range of 6.5 to 7.5.

5. A method according to claim 1, wherein the heating of the spent bauxite is supplemented and accompanied by water removal by means of filtration.

6. A method according to claim 1, wherein the downstream processing of the hydrogen fluoride driven off during the regenerating step includes using the hydrogen fluoride to supplement hydrogen fluoride used for aluminium production from bauxite by reacting the bauxite with hydrogen fluoride.

7. A method according to claim 1, wherein the downstream processing of the hydrogen fluoride driven off during the regenerating step includes reacting the hydrogen fluoride with sodium hydroxide, followed by addition of calcium hydroxide to the resultant sodium fluoride solution to precipitate the fluoride as a calcium fluoride product or by product, in accordance with Reactions (3) and (4):

$$HF + NaOH \rightarrow NaF + H_2O \qquad (3)$$

$$2NaF + Ca(OH)_2 \rightarrow CaF_2 + NaOH \qquad (4).$$

8. A method according to claim 1, wherein the downstream processing of the hydrogen fluoride driven off during the regenerating step includes scrubbing the hydrogen fluoride-containing gas from the regenerating step with a calcium hydroxide solution in the form of a milk of lime solution, to precipitate the fluoride as a calcium fluoride product in accordance with Reaction (5):

$$2HF + Ca(OH)_2 \rightarrow CaF_2 + 2H_2O \qquad (5).$$

9. A method according to claim 1, which includes adding an acid to the contacting step to maintain the pH of the water in the range of 6.5 to 7.5.

10. A method according to claim 1, wherein the heating of the spent bauxite is supplemented and accompanied by water removal by means of filtration.

11. A method according to claim 1, wherein the downstream processing of the hydrogen fluoride driven off during the regenerating step includes using the hydrogen fluoride to supplement hydrogen fluoride used for aluminium production from bauxite by reacting the bauxite with hydrogen fluoride.

12. A method according to claim 1, wherein the downstream processing of the hydrogen fluoride driven off during the regenerating step includes reacting the hydrogen fluoride with sodium hydroxide, followed by addition of calcium hydroxide to the resultant sodium fluoride solution to precipitate the fluoride as a calcium fluoride product or by product, in accordance with Reactions (3) and (4):

$$HF + NaOH \rightarrow NaF + H_2O \qquad (3)$$

$$2NaF + Ca(OH)_2 \rightarrow CaF_2 + NaOH \qquad (4).$$

13. A method according to claim 1, wherein the downstream processing of the hydrogen fluoride driven off during the regenerating step includes scrubbing the hydrogen fluoride-containing gas from the regenerating step with a calcium hydroxide solution in the form of a milk of lime solution, to precipitate the fluoride as a calcium fluoride product in accordance with Reaction (5):

$$2HF + Ca(OH)_2 \rightarrow CaF_2 + 2H_2O \qquad (5).$$

14. A method of treating water to remove fluoride ions from the water, thereby to reduce the dissolved fluoride content of the water, the method including:

in a contacting step, contacting water containing dissolved fluoride ions with alumina, by passing the water through a bed of the alumina which is thus in particulate form, with the fluoride ions reacting with the alumina to produce aluminium fluoride in accordance with Reaction (1):

$$Al_2O_3 + 3H_2O + 6F^- \rightarrow 2AlF_3 + 6OH^- \qquad (1)$$

in a regenerating step, regenerating the alumina, when spent, by heating the spent alumina to drive off fluoride ions as HF gas/vapour, in accordance with Reaction (2):

$$2AlF_3 + 3H_2O \rightarrow Al_2O_3 + 6HF \qquad (2);$$

recycling the regenerated alumina to the contacting step where it is used to remove further fluoride ions from the water; and passing on the HF gas/vapour driven off during the regenerating step, to downstream processing thereof.

15. A method according to claim 14, wherein the water that is treated is raw fluoride ion-containing water obtained during the production of aluminium from bauxite by reacting the bauxite with hydrofluoric acid.

16. A method according to claim 14, wherein the alumina with which the water is contacted is in the form of bauxite.

* * * * *